(12) United States Patent
De Leon et al.

(10) Patent No.: US 11,609,685 B1
(45) Date of Patent: Mar. 21, 2023

(54) PRESENTATION AND CONTROL OF USER INTERACTION WITH A RING-SHAPED USER INTERFACE ELEMENT

(71) Applicant: Capital One Services, LLC, McLean, VA (US)

(72) Inventors: Erik Jay Salazar De Leon, Richmond, VA (US); Thomas Dohan, II, Elmhurst, IL (US); Xiang Lan, South Orange, NJ (US); Min Jung Kim, Fairfax, VA (US); Vivian Wang, McLean, VA (US); Jennifer L Ellison, New Kent, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/649,995

(22) Filed: Feb. 4, 2022

(51) Int. Cl.
    *G06F 3/0482* (2013.01)

(52) U.S. Cl.
    CPC .................. *G06F 3/0482* (2013.01)

(58) Field of Classification Search
    CPC .... G06F 11/3664; G06F 16/00; G06F 3/0482; G06Q 40/02; G07F 17/323
    See application file for complete search history.

(56) References Cited

U.S. PATENT DOCUMENTS

| | | | | |
|---|---|---|---|---|
| 2013/0268260 | A1* | 10/2013 | Lundberg | G06F 11/3664 704/8 |
| 2014/0354648 | A1* | 12/2014 | Bak | G06F 16/00 345/440 |
| 2020/0143464 | A1* | 5/2020 | Caldwell | G06Q 40/02 |
| 2022/0076537 | A1* | 3/2022 | Lerner | G07F 17/323 |

\* cited by examiner

*Primary Examiner* — Cao H Nguyen

(74) *Attorney, Agent, or Firm* — Harrity & Harrity, LLP

(57) ABSTRACT

In some implementations, a system may receive interaction data indicating an interaction time and amount. The system may categorize the interaction in a category of a plurality of categories. For each category, the system may compare a total category amount with an average category amount. The system may determine, for each category, a proportion of the total category amount relative to a total account amount. The system may transmit, to a user device, user interface data associated with a ring-shaped user interface element that includes a plurality of segments corresponding to the plurality of categories. The user interface data indicates a width of a particular segment that is based on the comparison of the total category amount for a corresponding category with the average category amount, and an arc length that is based on the proportion of the total category amount for the corresponding category to the total account amount.

20 Claims, 9 Drawing Sheets

PRESENTATION AND CONTROL OF USER INTERACTION WITH A RING-SHAPED USER INTERFACE ELEMENT

BACKGROUND

A display of a user device may display a user interface (e.g., a graphical user interface). A user interface may permit interactions between a user of the user device and the user device. In some cases, the user may interact with the user interface to operate and/or control the user device to produce a desired result. For example, the user may interact with the user interface of the user device to cause the user device to perform an action. Additionally, the user interface may provide information to the user.

SUMMARY

Some implementations described herein relate to a system for providing data for presentation of a ring-shaped user interface element. The system may include one or more memories and one or more processors communicatively coupled to the one or more memories. The one or more processors may be configured to receive interaction data based on an interaction between a user and a third party, wherein the interaction data is associated with an account of the user and indicates a time of the interaction and an interaction amount. The one or more processors may be configured to categorize the interaction in a category of a plurality of categories. The one or more processors may be configured to determine, for each category of the plurality of categories, a total category amount, wherein the total category amount is a sum of interaction amounts for a plurality of interactions in a particular category, of the plurality of categories, that occur within a particular time frame. The one or more processors may be configured to compare, for each category, the total category amount with an average category amount for the particular category, wherein the average category amount is based on historical interaction data for the particular category. The one or more processors may be configured to determine, for each category, a proportion of the total category amount relative to a total account amount, wherein the total account amount is a total amount for interactions associated with the account that occur within the particular time frame. The one or more processors may be configured to transmit, to a user device, user interface data associated with the ring-shaped user interface element to be displayed on a display of the user device, wherein the ring-shaped user interface element includes a plurality of segments corresponding to the plurality of categories.

Some implementations described herein relate to a method for providing data for presentation of a ring-shaped user interface element. The method may include receiving, by a system and from a user device of a user, data indicating a request for information related to a plurality of categories of interactions associated with an account of the user. The method may include obtaining, by the system and from a user profile database, a first set of data indicating first interaction amounts for a first plurality of interactions associated with the plurality of categories for a first time frame, and a second set of data indicating second interaction amounts for a second plurality of interactions associated with the plurality of categories for a second time frame, wherein the second time frame is longer than the first time frame. The method may include determining, by the system and for each category, a total category amount based on the first interaction amounts indicated in the first set of data. The method may include determining, by the system and for each category, an average category amount based on the second interaction amounts indicated in the second set of data. The method may include determining, by the system and for each category, a proportion of the total category amount relative to a total account amount, wherein the total account amount is a total of the first interaction amounts in the first set of data. The method may include transmitting, by the system and to the user device, data indicating the ring-shaped user interface element to be displayed on a display of the user device, wherein the ring-shaped user interface element includes a plurality of segments corresponding to the plurality of categories, where a width of a particular segment is based on a comparison of the total category amount for a corresponding category with the average category amount for the corresponding category, and where an arc length of the particular segment is based on the proportion of the total category amount for the corresponding category to the total account amount.

Some implementations described herein relate to a user device. The user device may include a memory and one or more processors communicatively coupled to the memory. The one or more processors may be configured to present, on a user interface associated with a user account, an interaction element. The one or more processors may be configured to detect a user interaction, with the user device, that indicates the interaction element. The one or more processors may be configured to present, on the user interface and based on the user interaction, a ring-shaped user interface element that includes a plurality of segments corresponding to a plurality of categories associated with the user account. Each category may have, associated with that category: a total category amount corresponding to a total amount for a first plurality of interactions associated with the user account within a first time frame, and an average category amount corresponding to an average amount for a second plurality of interactions associated with the user account within a second time frame, wherein the second time frame is longer than the first time frame. A width of a particular segment is based on a comparison between the total category amount for a corresponding category with the average category amount for the corresponding category. An arc length of the particular segment is based on a proportion of the total category amount for the corresponding category relative to a total account amount, wherein the total account amount is a total amount for interactions associated with the user account that occur within the first time frame.

DETAILED DESCRIPTION

Figure 1A:
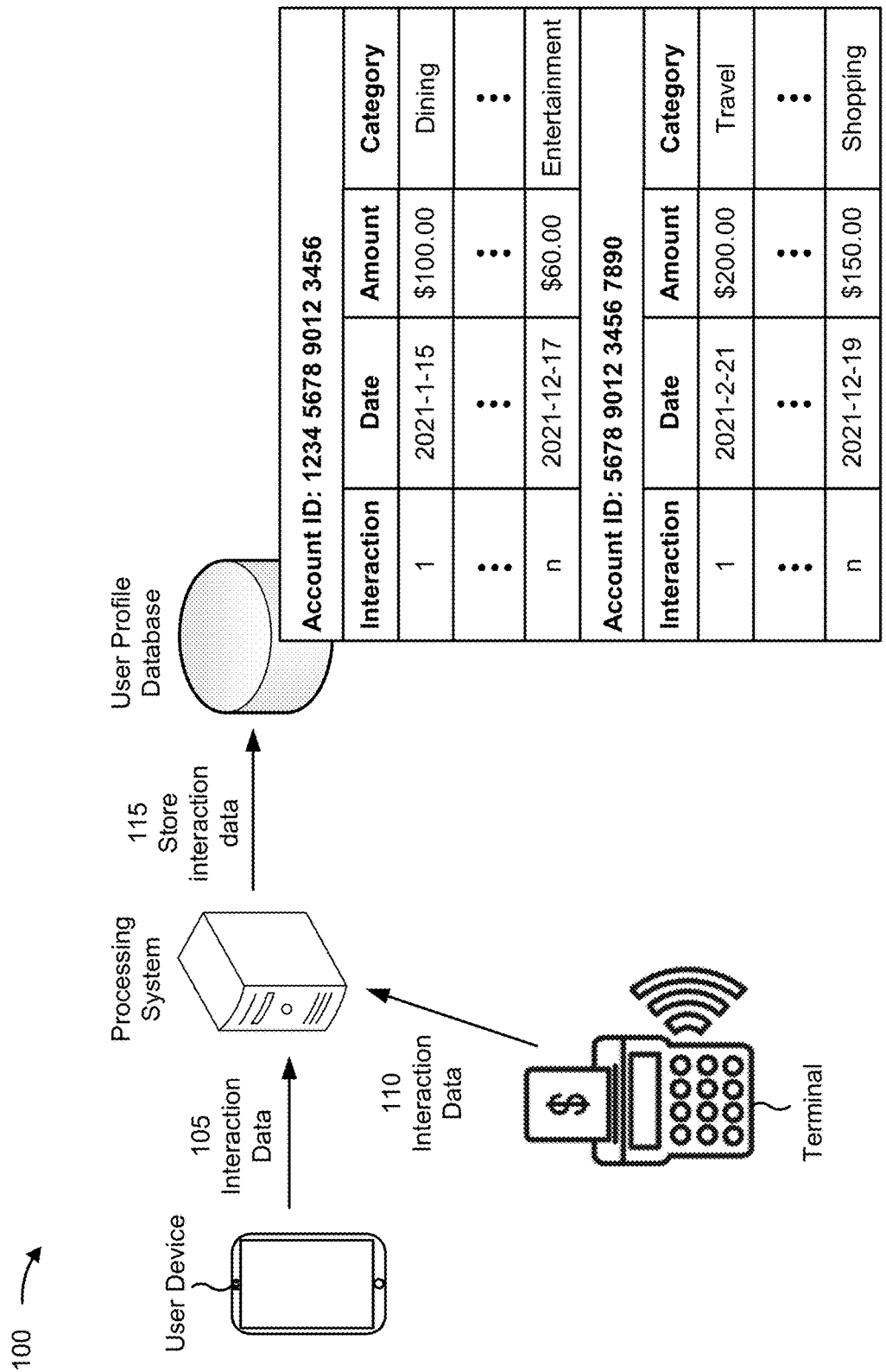
FIGS. 1A-1D are diagrams of an example implementation relating to presentation and control of user interaction with a ring-shaped user interface element.

The following detailed description of example implementations refers to the accompanying drawings. The same reference numbers in different drawings may identify the same or similar elements.

A user may participate in various activities (e.g., engaging in interactions with one or more third parties) via one or more accounts associated with the user. An institution operating the account(s) may maintain records of data corresponding to each activity, including a particular category (e.g., entertainment, dining, travel, shopping) in which the corresponding activity falls, for each account. In some instances, the user may want to derive certain insights about the user's participation in the various activities in a quick and efficient manner. For example, the user may want to compare data associated with one or more activities occurring in one time frame with corresponding data associated with similar types of activities occurring in another time frame. Additionally, or alternatively, the user may want to compare data associated with one or more activities with corresponding data associated with one or more other activities occurring in the same time frame. Furthermore, the user may want to aggregate the relevant data across all of the user's accounts for such comparisons. Accordingly, a user interface (UI) that allows the user to view the data in an aggregated format may be beneficial. However, techniques frequently involve presenting the data on a UI in chronological order of when the events occurred and/or in list form. Additionally, the data is often segregated by accounts. As a result, the user has to inefficiently determine any insights by navigating through UIs for different sets of data presented on the UIs and manually combining and/or processing the data. Furthermore, requiring the user to navigate through different UIs inefficiently utilizes computing resources. Thus, it is desirable for a UI to provide a user-friendly and efficient way for a user to visualize and gain insights from the data.

Some implementations described herein enable a system to provide data for presentation of a UI element on a user device that visually indicates a comparison of a first set of data, of a particular data type, related to one or more user activities across a first time frame with a second set of data, of the same data type, related to one or more user activities across a second time frame. Additionally, the first set of data may include multiple subsets of data. The UI element may include one or more segments corresponding to the first user set and/or the multiple subsets of data. The width of each segment may be based on the comparison of the first set of data with the second set of data (e.g., a value or an amount from the first set of data corresponding to the segment with an average value or amount determined from the second set of data). The length of each segment may be based on a comparison of the corresponding subset of data with the other subsets of data (e.g., relative proportions). Accordingly, by using the UI element to aggregate data and visually depict one or more comparisons of data sets, rather than providing and presenting the data in multiple UIs and/or UI elements, computing resources can be conserved.

In some implementations described herein, the first set of data may indicate interaction amounts associated with multiple interactions between the user and one or more third parties that occur within the first time frame. The second set of data may indicate interaction amounts associated with multiple interactions between the user and one or more third parties that occur within the second time frame. One or more of the third parties in the interactions associated with the first set of data may be the same as one or more of the third parties in the interactions associated with the second set of data, or they may be different. Each of the interactions may be associated with a category (e.g., entertainment, dining, travel, shopping). For each category, the total interaction amount from the first data set (e.g., a sum of all of the interaction amounts) may be compared with an average interaction amount from the second data set. Additionally, the total interaction amount for one category may be compared with the total interaction amounts for other categories.

In some implementations described herein, the UI element may be a ring-shaped UI element, and each of the multiple segments may correspond to a category of interactions. The width of each segment (e.g., radial width measured in a radial direction from an inner circumference of the segment to an outer circumference of the segment) may be based on the comparison of the total interaction amount from the first data set with the average interaction amount from the second data set. For example, if the total interaction amount for a category is greater than the average interaction amount by a threshold amount, the width of the segment corresponding to that category may be greater than a default width. In contrast, if the total interaction amount for a category is less than the average interaction amount by a threshold amount, the width of the segment corresponding to that category may be less than the default width. Additionally, the arc length for a particular segment may be based on a proportion of the total interaction amount for the corresponding category relative to a total interaction amount from the first data set across all the categories.

FIGS. 1A-1D are diagrams of an example 100 associated with presentation and control of user interaction with a ring-shaped user interface element. As shown in FIGS. 1A-1D, example 100 includes a processing system, a user profile database, a user device, and a terminal. These devices are described in more detail in connection with FIGS. 2 and 3.

As shown in FIG. 1A, a user may engage in an interaction with a third party (e.g., a merchant or a service provider). For example, the user may perform the interaction via the user device (e.g., in an online interaction), and the processing system may receive interaction data associated with the interaction from the user device, as shown by reference number 105, such as over a network, as described in more detail hereinafter. As another example, the user may perform the interaction at a terminal (e.g., a point-of-sale (PoS) terminal at a location of the third party), and the processing system may receive interaction data associated with the interaction from the terminal, as shown by reference number 110, such as over the network. The interaction data may indicate a time of the interaction and an interaction amount.

As shown by reference number 115, the processing system may store the interaction data (e.g., in a user profile database) under a user account associated with the user. In some implementations, the user may have multiple accounts with which the user may perform the interaction. The accounts may have corresponding unique account identifiers (e.g., an account ID number, a primary account number (PAN), or a virtual card number). The interaction data may include the account identifier used in the particular interaction, and the processing system may store the interaction data (e.g., interaction amount and interaction date) in the user profile database in association with the particular account identifier.

As further shown in FIG. 1A, each interaction may be associated with a category (e.g., dining, entertainment, travel, shopping, or other) when the corresponding interaction data is stored in the user profile database. In some implementations, the interaction data received by the processing system may indicate the category for the corresponding interaction. Alternatively, the processing system may categorize the interaction, with one or more categories of multiple possible categories, based on the interaction data.

For example, the processing system may categorize the interaction based on the interaction data (e.g., interaction amount and/or the interaction time) and one or more associated rules or conditions. For example, if the interaction data indicates that the interaction occurred in the morning (e.g., before 10:00 AM) and is less than a threshold amount (e.g., $10), the processing system may categorize the interaction as dining (e.g., for coffee or breakfast). As another example, if the interaction data indicates a location of the interaction (e.g., a zip code and/or geographic coordinates) that is a threshold distance away from an address and/or location associated with the user's account, and the interaction data further indicates that the interaction occurred during a holiday or within a threshold time frame from the holiday, the processing system may categorize the interaction as travel.

In some implementations, the interaction data may additionally indicate third party information associated with the third party from the interaction. The third party information may include a third party identifier (e.g., a third party name or a unique identifier), by which the processing system may identify the third party, and/or a third party type (e.g., movie theater, restaurant, hotel, grocery store). Each third party identifier and/or third party type may be associated with one or more of the possible categories, for example, in a third party entity database. As a result, the processing system may use the third party information to identify a corresponding category with which to categorize the interaction (e.g., by searching the third party entity database for the third party identifier and/or third party type). Additionally, or alternatively, the processing system may have one or more rules or conditions to determine the category from the third party information. For example, if the third party information indicates a movie theater or an amusement park as the third party type, then the processing system may categorize the interaction as entertainment. As another example, if the third party information indicates a hotel or an airline as the third party type, then the processing system may categorize the interaction as travel. As another example, if the third party information indicates a restaurant as the third party type, then the processing system may categorize the interaction as dining. As yet another example, if the third party information indicates a retail or grocery third party type, then the processing system may categorize the interaction as shopping.

In some implementations, the user may manually indicate a category, from the multiple possible categories, for a particular interaction. The user may indicate the category at the time of the interaction (e.g., when the interaction is performed via the user device). For example, after the processing system has received the interaction data (e.g., from the user device or from the terminal), the processing system may transmit a message to the user device (e.g., via electronic mail, a short message serve (SMS) message, or a message internal to an application stored on the user device) requesting the user's input for the category. The user may select a category from a list of possible categories or may manually input a category (e.g., in a dedicated entry field displayed on the user device via the application). Additionally, or alternatively, the user may indicate the category after the interaction data has been stored in the user profile database and the user has accessed the interaction data via the user device (e.g., via the application stored on the user device or a web-based application accessed by the user device over the network). In a similar manner, the user may change categories automatically applied to interactions by the processing system.

In some implementations, the processing system may use a machine learning model to determine the category. For example, the machine learning model may be a supervised machine learning model trained based on the interaction data and/or categories manually input by the user for particular interactions. Additionally, or alternatively, the machine learning model may be an unsupervised machine learning model trained based on one or more clusters of users that have similar interactions and/or demographics (e.g., age range and/or sex).

In some instances, more than one category may be applicable to an interaction. For example, if the interaction data indicates that the interaction occurred at a particular venue (e.g., as indicated by the third party information) during a dining time of day (e.g., as indicated by the interaction time), then the processing system may determine that the interaction could be characterized as entertainment or dining. In such an instance, the processing system may search historical interaction data of the user and/or of other users to identify one or more past interactions that include the venue or a similar venue (e.g., a venue having a similar third party type) and/or that occurred at a similar time of day (e.g., within a threshold time frame of the time of the interaction). The processing system may then categorize the interaction with the category associated with the identified past interaction of the user. If the user does not have a similar interaction in the user's historical interaction data, then the processing system may categorize the interaction based on the most widely used category (e.g., having the highest count) for a similar interaction.

Figure 1B:
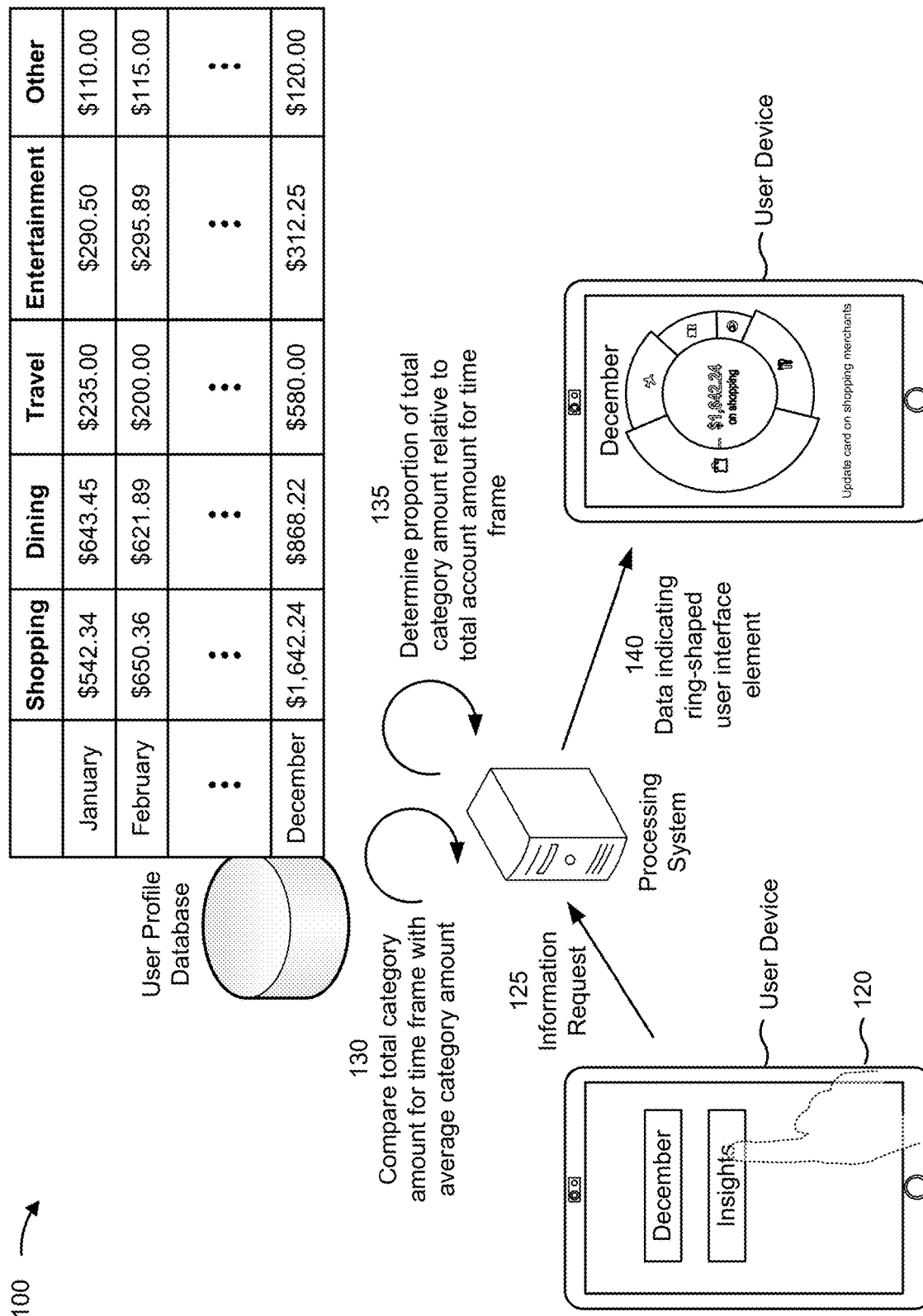

As shown in FIG. 1B, the user may initiate a request for information (e.g., insights) about the user's account(s) from the user device (e.g., via the application stored on the user device or via the web-based application accessed by the user device over the network). For example, as shown by reference number 120, the user may input the request via the user device by selecting a dedicated option (or interaction element) to access the information (e.g., via a button on a touchscreen display of the user device). Additionally, the user may specify a time frame (e.g., calendar month) for which the user would like the information. The user device may detect the user interaction with the interaction element. As shown by reference number 125, the processing system may receive (e.g., from the user device) data indicating the information request.

In some implementations, the requested information may relate to one or more data types of the interaction data (e.g., interaction amounts) for one or more of the user's accounts. For example, as shown in FIG. 1B, the requested information may relate to interaction amounts in different categories of interactions. For each category, the processing system may identify a first set of data indicating the requested information (e.g., interaction amounts) for a first time frame (e.g., the time frame specified by the user). The processing system may also identify a second set of data indicating a similar type of information (e.g., interaction amounts) for a second time frame. The second time frame may be longer than the first time frame. The second time frame may also include the first time frame or overlap with the first time frame. For example, the second time frame may include the user's entire interaction history stored in the user profile database. Alternatively, the second time frame may be a specified time frame (e.g., a calendar year), and may be specified by the user (e.g., when initiating the information request). The first set of data and the second set of data may be identified across all of the user's accounts. Alternatively, the user may select a specific account or combination of accounts for which the information is requested.

For each category, the processing system may determine, from the first set of data, a total category amount (e.g., a sum of interaction amounts for the interactions in the particular category that occur in the first time frame). For each category, the processing system also may determine, from the second set of data, an average category amount. The average interaction amount may be the total interaction amounts across the second time frame, averaged for a time frame equivalent to the first time frame (e.g., a month, 30 days, etc.). As shown by reference number 130, the processing system may compare, for each category, the total category amount for the first time frame with the average category amount. For example, the processing system may determine a difference between the total category amount and the average category amount. Additionally, as shown by reference number 135, for each category, the processing system may determine a proportion of the total category amount relative to a total account amount for the first time frame. The total account amount may be a sum of the total account amounts for all of the categories for the first time frame. These determinations may be used to determine characteristics of the UI element, as described in more detail below. As shown by reference number 140, the processing system may transmit, to the user device, UI data indicating the UI element.

Figure 1C:
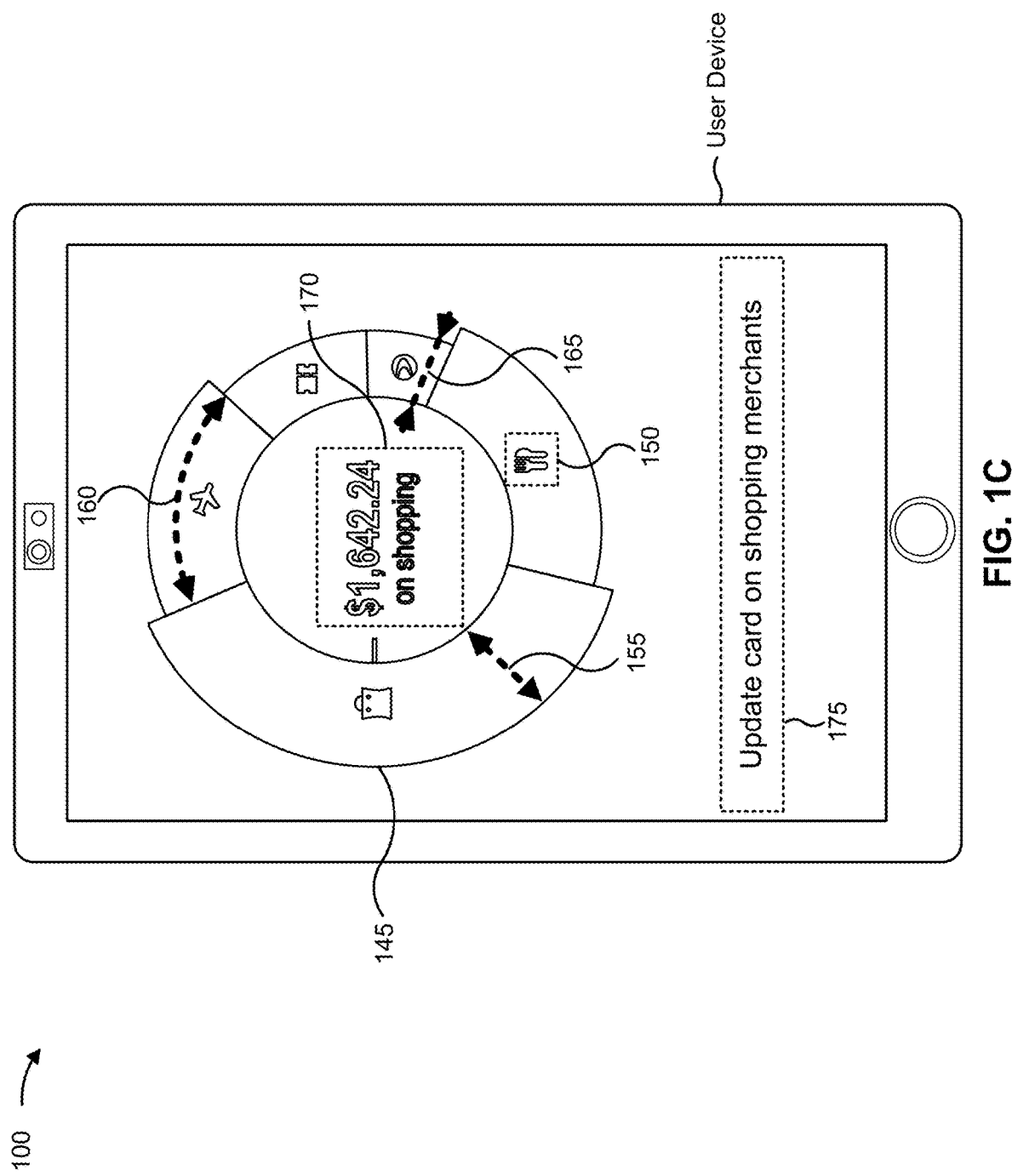

As shown in FIG. 1C, the UI element may be a ring-shaped UI element that includes multiple segments 145. Each segment 145 may correspond to one of the categories (e.g., dining, entertainment, travel, shopping, or other) and may have an icon 150 representative of the particular category. Each segment may have a width 155 (e.g., in a radial direction) and a length 160 (e.g., an arc length extending in a circumferential direction).

In some implementations, the width 155 of each segment 145 may be based on a comparison of the data for the corresponding category in the first set of data with the corresponding data in the second set of data. For example, in implementations in which the first set of data indicates the total category amounts for the first time frame, the processing system may determine the width 155 of each segment 145 by determining whether or not the total category amount is within a threshold range of the average category amount, determined from the second set of data over the second time frame, as described above. If the total category amount is within the threshold range, then the width 155 of the corresponding segment 145 may be a default width 165 (e.g., having a default value). If the total category amount is above an upper limit of the threshold range, then the width 155 may be greater than the default width 165. If the total category amount is below a lower limit of the threshold range, then the width 155 may be smaller than the default width 165. By visually presenting the data to the user in such a format (e.g., the width indicating changes from the average), the processing system is able to efficiently inform the user of changes in the user's interaction activity in a specified time frame, thereby conserving computing resources. Based on such activity, the processing system may further be able to provide suggestions and/or options to the user to help manage the user's subsequent interaction activity.

In some implementations, the threshold range may be determined by a threshold value added and subtracted to the average category amount to derive the upper and lower limits of the threshold range. For example, for a threshold value of $10 and an average category amount of $200, the threshold range would be between $190 and $210. Alternatively, the threshold range may be based on a threshold percentage applied to the average category amount to derive the upper and lower limits of the threshold range. For example, for a threshold percentage of 10% and an average category amount of $200, the threshold range would be between $180 and $220.

The amount that a width 155 of a particular segment 145 is greater than or smaller than the default width 165 (e.g., when the total category amount falls outside of the threshold range) may be based on how far the total category amount deviates from the upper limit or lower limit of the threshold range. In some implementations, the width 155 may increase/decrease in stepped increments from the default width 165 in accordance with ranges of deviation of the total category amount from the upper/lower limit of the threshold range. For example, for deviations between $1 and $10 (or 1% to 10%), the width may increase or decrease by a first amount. For deviations between $11 and $20 (or 11% to 20%), the width 155 may increase or decrease by a second amount. Alternatively, the width 155 may increase/decrease as a function of the deviation of the total category amount from the upper limit or lower limit of the threshold range. The function may be linear or non-linear (e.g., logarithmic or exponential). For example, for a linear function, for every unit of deviation (e.g., $1 or 1%), the width 155 may increase/decrease a set value. As another example, for a parabolic function, the rate at which the width 155 increases/decreases may be greater as the deviation gets larger.

In some implementations, the amount that the width 155 increases/decreases from the default width 165 may be based on a threshold value. For example, for a default width of 20 mm (or ¾ inch (¾")), the first amount for a stepped increase/decrease may be 5 mm (or ¼"), and the second amount for a stepped increase/decrease may be 10 mm (or ½"). As another example, for a linear function, the increase/decrease amount of the width 155 may be 5 mm (or ¼") for every unit of deviation of the total category amount from the upper/lower limit of the threshold range. Alternatively, the amount that the width 155 increases/decreases from the default width 165 may be based on a threshold percentage. For example, for a default width of 20 mm (or ¾"), the first amount for a stepped increase/decrease may be 5% of the default width, and the second amount for a stepped increase/decrease may be 10%. As another example, for a linear function, the width 155 may increase by 5% for every unit of deviation of the total category amount from the upper/lower limit of the threshold range.

In some implementations, the length 160 of each segment 145 may be based on a comparison of the data for the corresponding category in the first set of data with the corresponding data for the other categories in the first set of data. For example, in implementations in which the first set of data indicates the total category amounts for the categories, the processing system may determine the length 160 of each segment 145 by determining a proportion of the total category amount for the category corresponding to the particular segment 145 relative to a sum of all of the total category amounts across all accounts of the user (also referred to herein as the total account amount). The UI element may have an overall length (or circumference for a ring-shaped UI element), which may be a specific value (e.g., 100 mm or 4"). Alternatively, the overall length may be based on the screen size of the user device. For example, for a linearly-shaped UI element, the overall length may be a percentage (e.g. 75%) of a width of the screen of the user device. As another example, for a ring-shaped UI element, the diameter of the UI element may be a percentage (e.g., 75%) of a width of the screen of the user device, and the overall length (e.g., the circumference of the ring-shaped UI element) may be determined from the diameter.

From the overall length, the length 160 of each segment 145 may be determined by applying the proportion of the corresponding total category amount to the overall length. For example, if the total category amount for a particular category has a proportion of 50% of the total account amount, then the length of the corresponding segment 145 may be 50% of the overall length of the UI element. Additionally, or alternatively, for a ring-shaped UI element, the proportion (e.g., 50%) may be applied to 360° to determine the rotation angle of the corresponding segment 145. Based on the rotation angle, the length 160 (e.g., arc length) of the segment 145 may be determined irrespective of an overall length, for example, with different screen sizes of different user devices.

Alternatively, the length 160 of each segment 145 may be based on a rank (e.g., 1-5) of the total category amounts (or proportions relative to the total account amount) of the corresponding categories. For example, each rank may have a specified length for the corresponding segment 145, the highest rank having the greatest length, and the lowest rank having the smallest length. As another example, each rank may have a specified proportion of the overall length of the UI element for the length 160 of the corresponding segment, the highest rank having the highest proportion, and the lowest rank having the smallest proportion.

As further shown in FIG. 1C, the UI element may include category information 170 (e.g., the total category amount) related to one or more categories. For a ring-shaped UI element, the category information 170 may be presented in a center of the ring. In some implementations, when the UI element is first presented on the display of the user device (e.g., in response to the user's information request), the category information 170 displayed may correspond to the category having the greatest width (e.g., the greatest deviation from the corresponding average category amount). Alternatively, the category information 170 displayed may correspond to the category having the highest total category amount (e.g., the greatest proportion relative to the total account amount) or the highest width. Additionally, or alternatively, the user may be able to change the category information 170 presented by tapping (e.g., on a touchscreen display of the user device) or hovering over (e.g., via a cursor) a segment corresponding to a different category. Additionally, or alternatively, the user may be able to specify the particular category information to be presented with the UI element either at the time the information request is made or after the UI element is presented on the user device.

As further shown in FIG. 1C, the UI element may include a selectable option 175 (or second interaction element) to receive information related to one or more categories. In some implementations, when the UI element is first presented on the display of the user device (e.g., in response to the user's information request), the selectable option 175 displayed may correspond to the category having the greatest width (e.g., the greatest deviation from the corresponding average category amount). Alternatively, the selectable option 175 displayed may correspond to the category having the highest total category amount (e.g., the greatest proportion relative to the total account amount). For example, if a category of shopping has the highest total category amount, the selectable option 175 may be to receive information and/or perform an action related to shopping merchants. As another example, if a category of dining has the highest total category amount, the selectable option 175 may be to receive information and/or perform an action related to restaurants. The selectable option 175 may include an option related to the user's historical interaction (e.g., third parties in the user's past interactions), the user's location (e.g., third parties within a threshold distance of the user's location), and/or the user's demographics (e.g., third parties with whom other users of similar demographics have interacted in the past). In some implementations, the user may be able to change the particular selectable option 175 presented on the display to relate to a different category by tapping (e.g., on a touchscreen display of the user device) or hovering over (e.g., via a cursor) a segment corresponding to the different category.

Figure 1D:
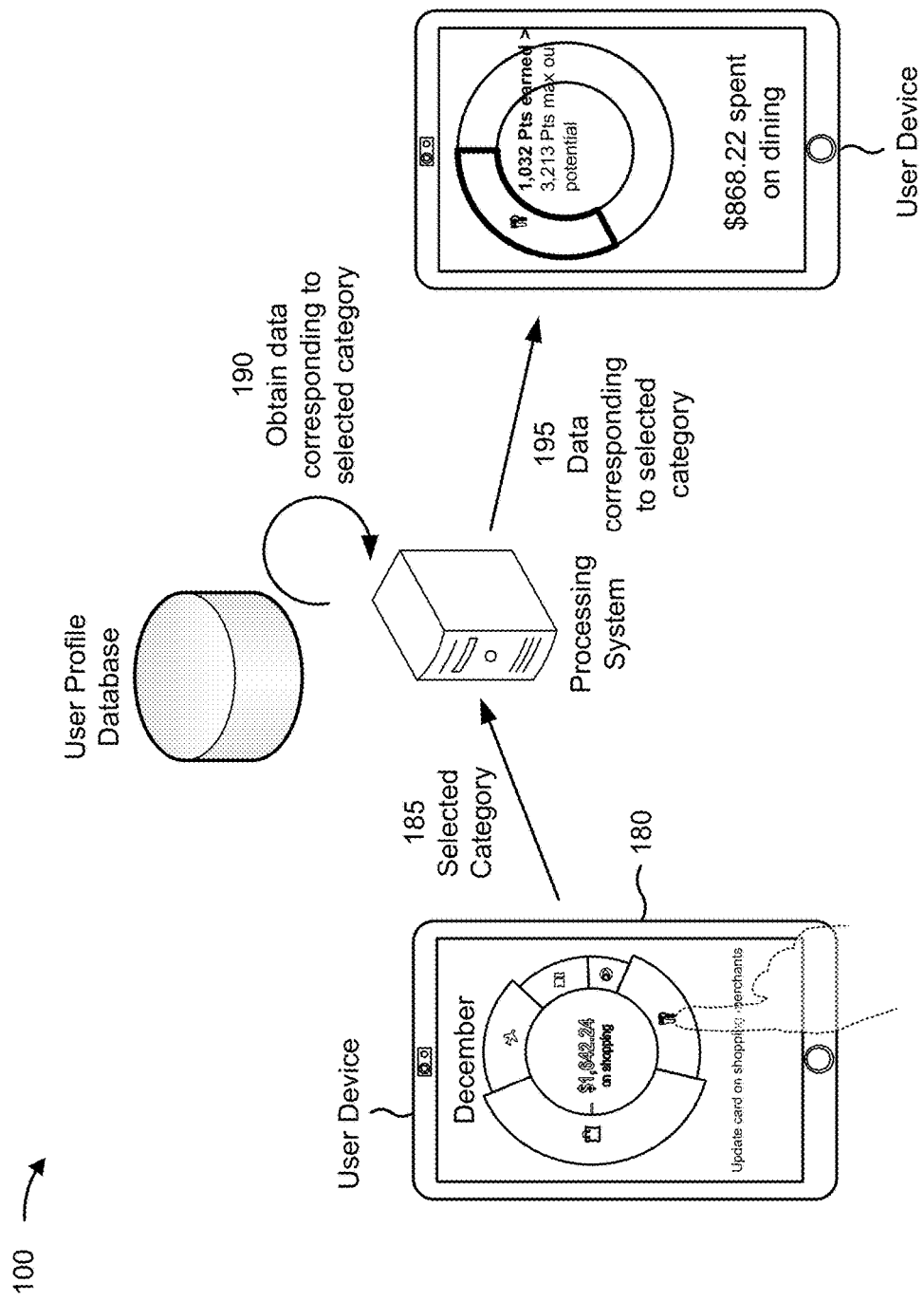

As shown in FIG. 1D, the processing system may provide the user with an option to receive more detailed information about a particular category. In some implementations, each segment of the UI element may be selectable by the user. As shown by reference number 180, the user may select a segment corresponding to a category for which the user desires the more detailed information, by touching the particular segment on the UI element (or clicking it with a cursor). The user device may detect this second user interaction with the particular segment. As shown by reference number 185, the processing system may receive data indicating the selected segment (e.g., a selection of the particular segment). The data may also indicate the corresponding category (e.g., the selected category). Alternatively, the processing system may determine the selected category based on the selected segment. As shown by reference number 190, the processing system may obtain (e.g., from the user profile database) data indicating the more detailed information for the selected category. For example, the more detailed information may show rewards points earned in the category and how many more points are available to be earned. As another example, the more detailed information may show a breakdown of the interaction amounts in the category by the different accounts of the users. As shown by reference number 195, the processing system may transmit, to the user device, data corresponding to the more detailed information related to the selected category.

Although implementations are described herein in connection with presentation and control of user interaction with a ring-shaped UI element, techniques described herein may be used for presentation and control of user interaction with UI elements having other shapes. For example, in some implementations, the UI element may have a vertical line or bar shape, a horizontal line or bar shape, or another shape.

Using the techniques described herein, a user device may present, on a UI, a ring-shaped UI element (or a UI element with another shape) that provides user-friendly visualization that aggregates comparative information to enable a user to efficiently gain insights about the user's account(s). Additionally, the ring-shaped UI element dynamically presents the information to the user, as the visualization changes for the user based on changes in the user's account information (e.g., interaction data). Further, the ring-shaped UI element, as presented on the user device, is unique and personalized to each user as the ring-shaped UI element is based on each user's personal account information (e.g., interaction data).

As indicated above, FIGS. 1A-1D are provided as an example. Other examples may differ from what is described with regard to FIGS. 1A-1D.

Figure 2:
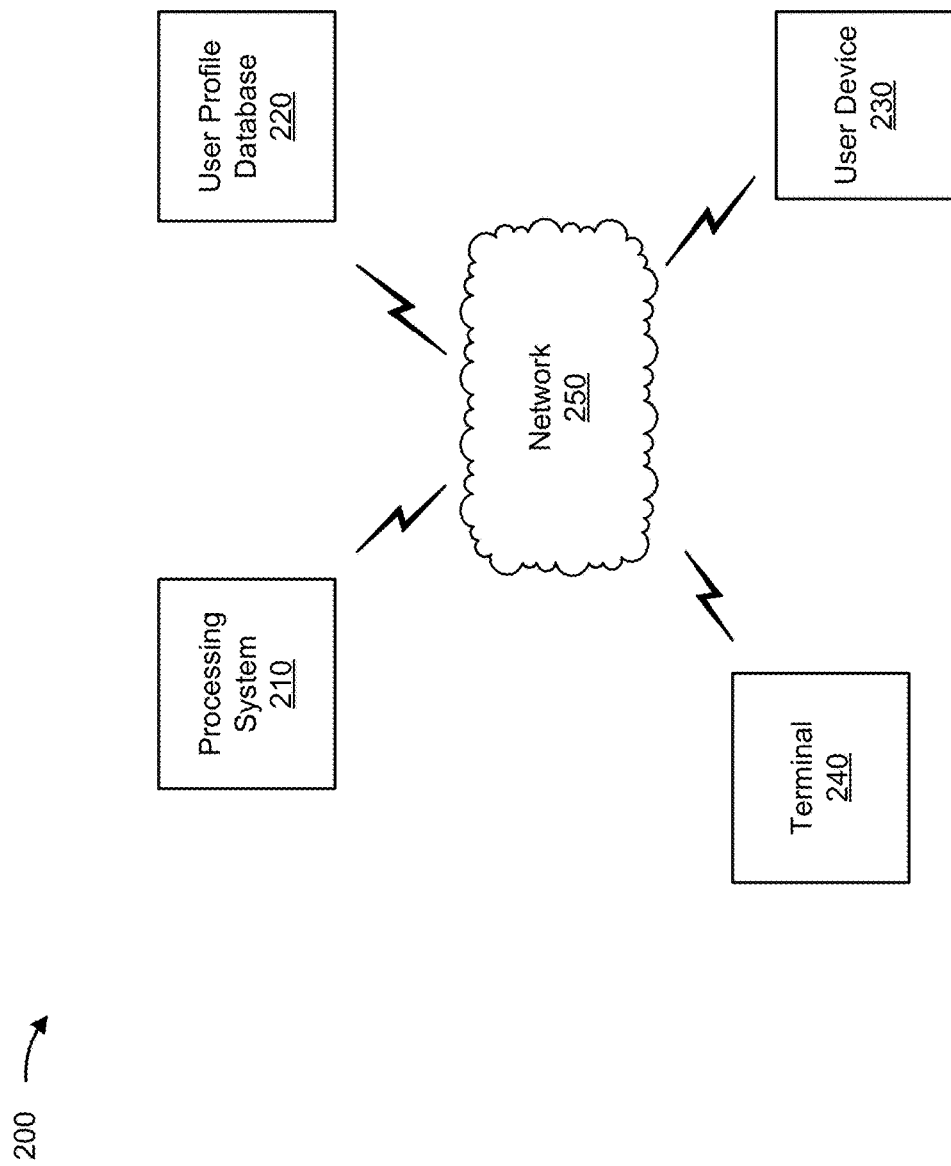
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a processing system 210, a user profile database 220, a user device 230, a terminal 240, and a network 250.

Devices of environment 200 may interconnect via wired connections, wireless connections, or a combination of wired and wireless connections.

The processing system 210 includes one or more devices capable of receiving, generating, storing, processing, providing, and/or routing information associated with presentation and control of user interaction with a ring-shaped user interface element, as described elsewhere herein. The processing system 210 may include a communication device and/or a computing device. For example, the processing system 210 may include a server, such as an application server, a client server, a web server, a database server, a host server, a proxy server, a virtual server (e.g., executing on computing hardware), or a server in a cloud computing system. In some implementations, the processing system 210 includes computing hardware used in a cloud computing environment.

The user profile database 220 includes one or more devices capable of receiving, generating, storing, processing, and/or providing information associated with presentation and control of user interaction with a ring-shaped user interface element, as described elsewhere herein. The user profile database 220 may include a communication device and/or a computing device. For example, the user profile database 220 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the user profile database 220 may store information associated with an account of a user, such as interaction data associated with interactions between the user and a third party, as described elsewhere herein.

The user device 230 includes one or more devices capable of receiving, generating, storing, processing, and/or providing information associated with presentation and control of user interaction with a ring-shaped user interface element, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The transaction terminal 240 includes one or more devices capable of facilitating an electronic transaction. For example, the transaction terminal 240 may include a point-of-sale (PoS) terminal, a payment terminal (e.g., a credit card terminal, a contactless payment terminal, a mobile credit card reader, or a chip reader), and/or an automated teller machine (ATM). The transaction terminal 240 may include one or more input components and/or one or more output components to facilitate obtaining data (e.g., account information) from a transaction device (e.g., a transaction card, a mobile device executing a payment application, or the like) and/or to facilitate interaction with and/or authorization from an owner or accountholder of the transaction device. Example input components of the transaction terminal 240 include a number keypad, a touchscreen, a magnetic stripe reader, a chip reader, and/or a radio frequency (RF) signal reader (e.g., a near-field communication (NFC) reader). Example output devices of transaction terminal 240 include a display and/or a speaker.

The network 250 includes one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
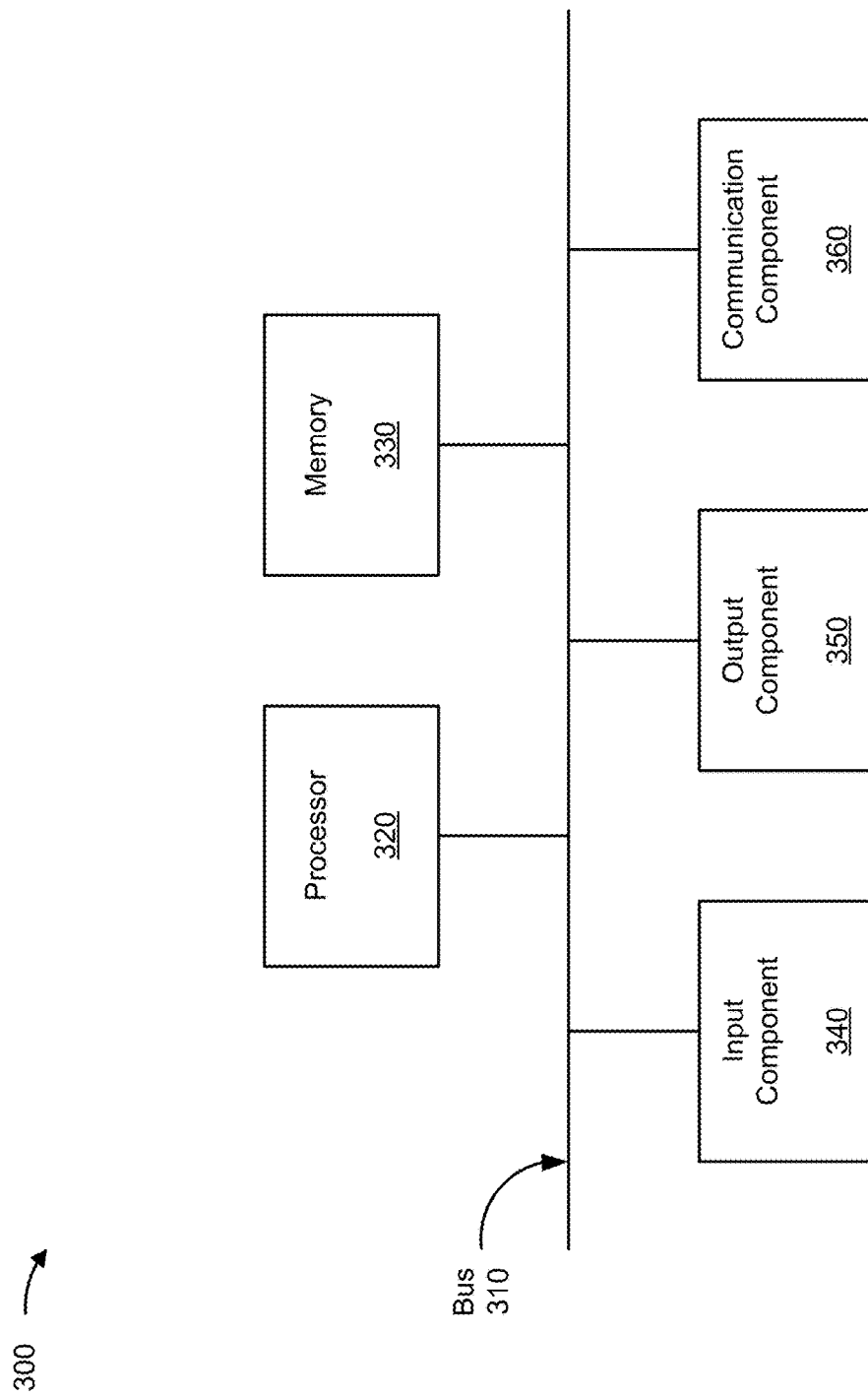
FIG. 3 is a diagram of example components of one or more devices of FIG. 2.

FIG. 3 is a diagram of example components of a device 300, which may correspond to the processing system 210, the user profile database 220, the user device 230, and/or the terminal 240. In some implementations, the processing system 210, the user profile database 220, the user device 230, and/or the terminal 240 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
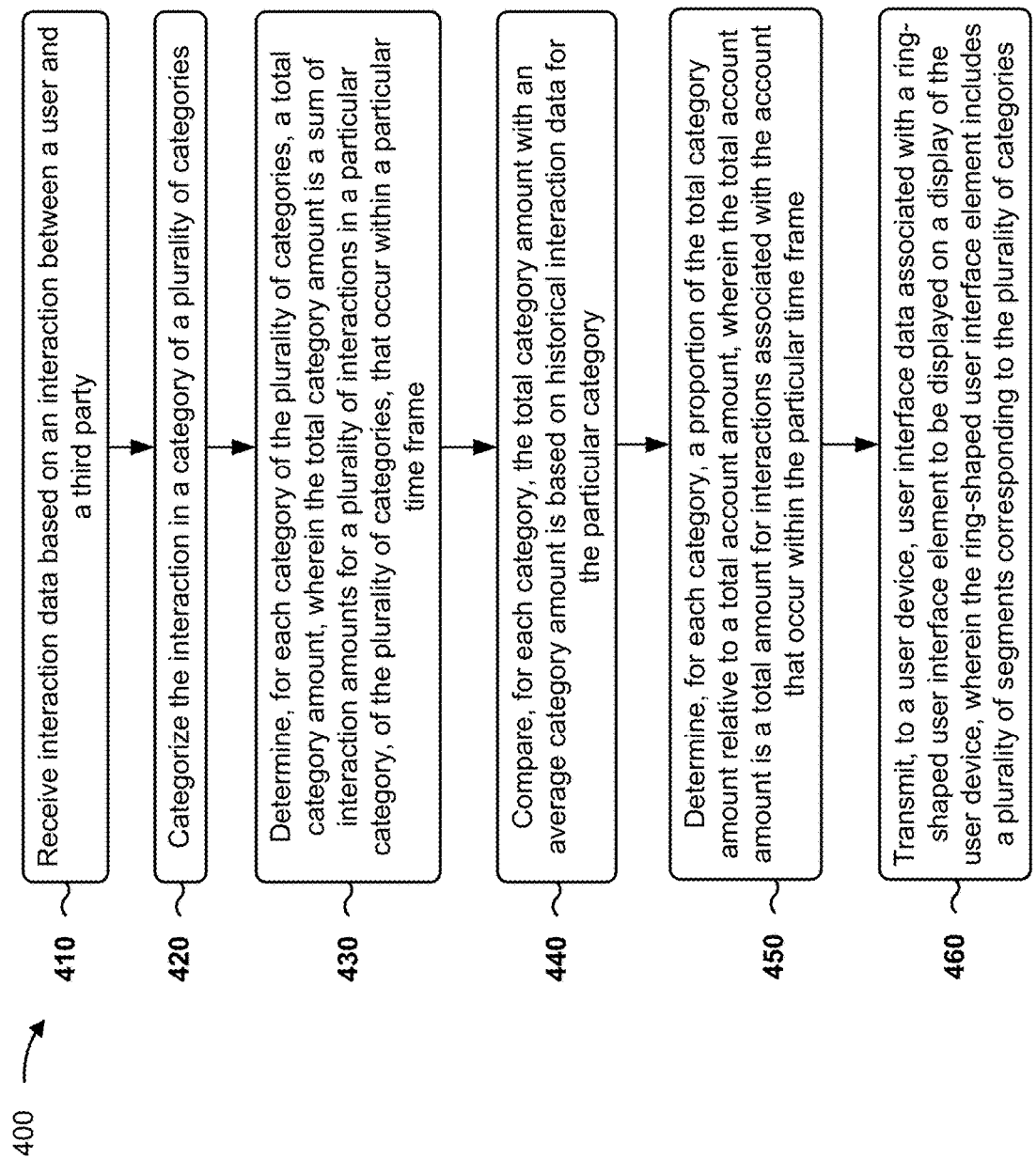
FIGS. 4-6 are flowcharts of example processes relating to presentation and control of user interaction with a ring-shaped user interface element.

FIG. 4 is a flowchart of an example process 400 associated with presentation and control of user interaction with a ring-shaped user interface element. In some implementations, one or more process blocks of FIG. 4 may be performed by a system (e.g., processing system 210). In some implementations, one or more process blocks of FIG. 4 may be performed by another device or a group of devices separate from or including the system, such as user device 230. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving interaction data based on an interaction between a user and a third party, wherein the interaction data is associated with an account of the user and indicates a time of the interaction and an interaction amount (block 410). As further shown in FIG. 4, process 400 may include categorizing the interaction in a category of a plurality of categories (block 420). As further shown in FIG. 4, process 400 may include determining, for each category of the plurality of categories, a total category amount, wherein the total category amount is a sum of interaction amounts for a plurality of interactions in a particular category, of the plurality of categories, that occur within a particular time frame (block 430). As further shown in FIG. 4, process 400 may include comparing, for each category, the total category amount with an average category amount for the particular category, wherein the average category amount is based on historical interaction data for the particular category (block 440). As further shown in FIG. 4, process 400 may include determining, for each category, a proportion of the total category amount relative to a total account amount, wherein the total account amount is a total amount for interactions associated with the account that occur within the particular time frame (block 450). As further shown in FIG. 4, process 400 may include transmitting, to a user device, user interface data associated with a ring-shaped user interface element to be displayed on a display of the user device, wherein the ring-shaped user interface element includes a plurality of segments corresponding to the plurality of categories (block 460). The user interface data indicates a width of a particular segment that is based on the comparison of the total category amount for a corresponding category with the average category amount for the corresponding category. The user interface data also indicates an arc length of the particular segment that is based on the proportion of the total category amount for the corresponding category to the total account amount.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
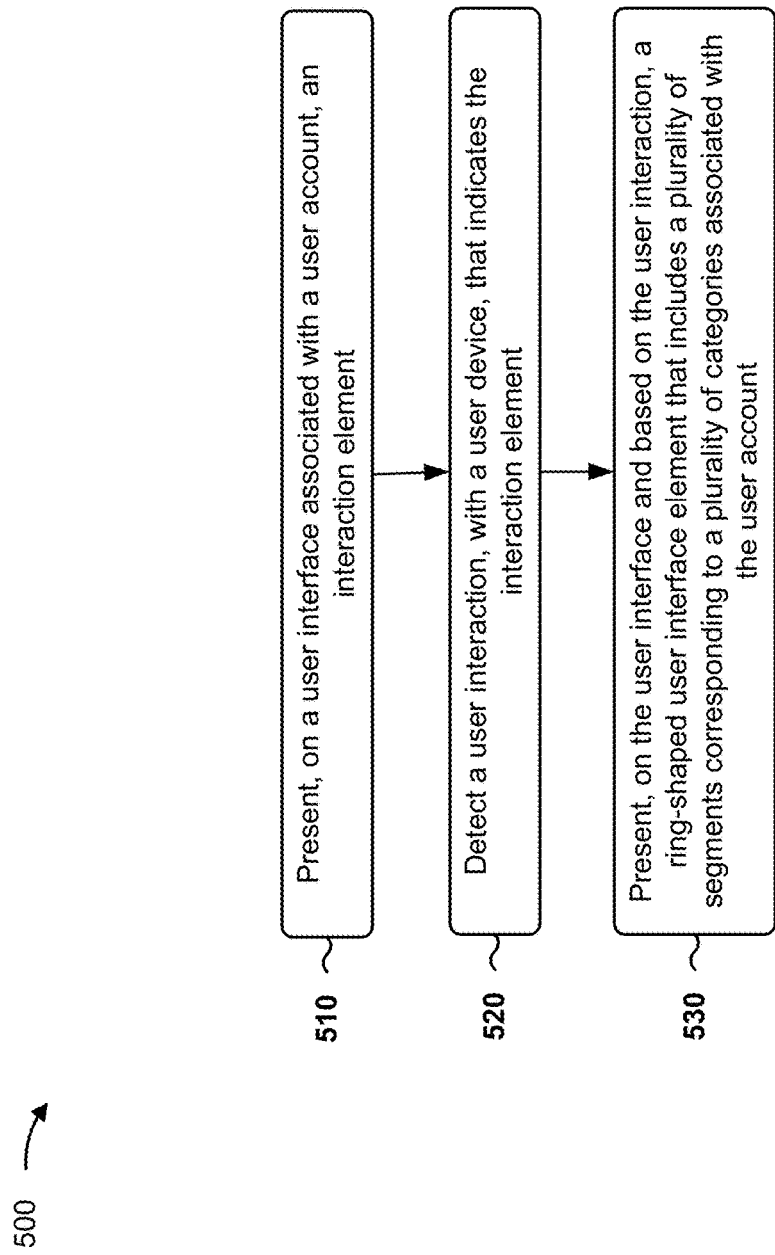

FIG. 5 is a flowchart of an example process 500 associated with presentation and control of user interaction with a ring-shaped user interface element. In some implementations, one or more process blocks of FIG. 5 may be performed by a user device (e.g., user device 230). Additionally, or alternatively, one or more process blocks of FIG. 5 may be performed by one or more components of device 300, such as processor 320, memory 330, input component 340, output component 350, and/or communication component 360.

As shown in FIG. 5, process 500 may include presenting, on a user interface associated with a user account, an interaction element (block 510). As further shown in FIG. 5, process 500 may include detecting a user interaction, with the user device, that indicates the interaction element (block 520). As further shown in FIG. 5, process 500 may include presenting, on the user interface and based on the user interaction, a ring-shaped user interface element that includes a plurality of segments corresponding to a plurality of categories associated with the user account (block 530). Each category has, associated with that category: a total category amount corresponding to a total amount for a first plurality of interactions associated with the user account within a first time frame, and an average category amount corresponding to an average amount for a second plurality of interactions associated with the user account within a second time frame, wherein the second time frame is longer than the first time frame. A width of a particular segment is based on a comparison between the total category amount for a corresponding category with the average category amount for the corresponding category. An arc length of the particular segment is based on a proportion of the total category amount for the corresponding category relative to a total account amount, wherein the total account amount is a total amount for interactions associated with the user account that occur within the first time frame.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
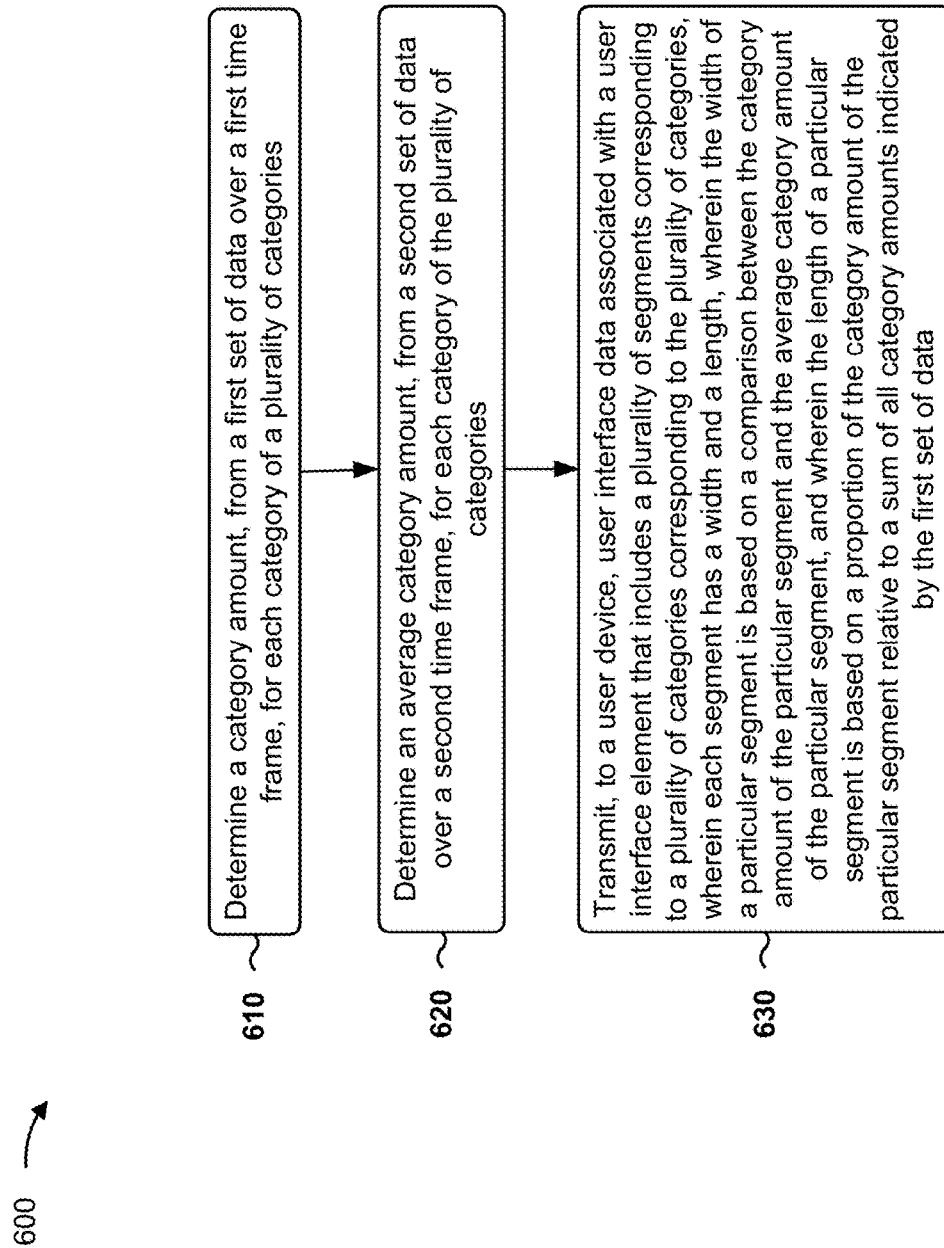

FIG. 6 is a flowchart of an example process 600 associated with presentation and control of user interaction with a ring-shaped user interface element. In some implementations, one or more process blocks of FIG. 6 may be performed by a system (e.g., processing system 210) or a user device (e.g., user device 230). Additionally, or alternatively, one or more process blocks of FIG. 6 may be performed by one or more components of device 300, such as processor 320, memory 330, input component 340, output component 350, and/or communication component 360.

As shown in FIG. 6, process 600 may include determining a category amount, from a first set of data over a first time frame, for each category of a plurality of categories (block 610). As further shown in FIG. 6, process 600 may include determining an average category amount, from a second set of data over a second time frame, for each category of the plurality of categories (block 620). As further shown in FIG. 6, process 600 may include transmitting, to a user device, user interface data associated with a user interface element that includes a plurality of segments corresponding to the plurality of categories (block 630). Each segment has a width and a length. The width of a particular segment may be based on a comparison between the category amount of the particular segment and the average category amount of the particular segment. The length of a particular segment may be based on a proportion of the category amount of the particular segment relative to a sum of all category amounts indicated by the first set of data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing data for presentation of a ring-shaped user interface element, the system comprising:
one or more memories; and
one or more processors, communicatively coupled to the one or more memories, configured to:
receive interaction data based on an interaction between a user and a third party, wherein the interaction data is associated with an account of the user and indicates a time of the interaction and an interaction amount;
categorize the interaction in a category of a plurality of categories;
determine, for each category of the plurality of categories, a total category amount, wherein the total category amount is a sum of interaction amounts for a plurality of interactions in a particular category, of the plurality of categories, that occur within a particular time frame;
determine, for each category, a difference between the total category amount and an average category amount for the particular category, wherein the average category amount is based on historical interaction data for the particular category;
determine, for each category, a proportion of the total category amount relative to a total account amount, wherein the total account amount is a total amount for interactions associated with the account that occur within the particular time frame; and
transmit, to a user device, user interface data associated with the ring-shaped user interface element to be displayed on a display of the user device, wherein the user interface data includes data for a plurality of segments, of the ring-shaped user interface element, corresponding to the plurality of categories,
wherein the user interface data indicates a width of a particular segment,
wherein the width is determined based on a default value and a comparison of a threshold range and the difference between the total category amount and the average category amount, and wherein the user interface data indicates an arc length of the particular segment that is based on the proportion of the total category amount for the corresponding category to the total account amount.

2. The system of claim 1, wherein each segment, of the plurality of segments, is selectable by the user, and the one or more processors are further configured to:
receive, from the user device, data indicating a selection of a segment of the plurality of segments; and
transmit, to the user device and based on the selection of the segment, data corresponding to information related to a category corresponding to the segment.

3. The system of claim 1, wherein the account is associated with one or more account identifiers, and each account identifier is associated with one or more of the plurality of categories.

4. The system of claim 3, wherein the interaction data includes an account identifier, and the one or more processors categorize the interaction based on the account identifier.

5. The system of claim 1, wherein the particular time frame is a calendar month.

6. The system of claim 1, wherein the one or more processors are configured to receive the interaction data from the user device or from a terminal.

7. A method for providing data for presenting a ring-shaped user interface element, comprising:
receiving, by a system and from a user device of a user, data indicating a request for information related to a plurality of categories of interactions associated with an account of the user;
obtaining, by the system and from a user profile database, a first set of data indicating first interaction amounts for a first plurality of interactions associated with the plurality of categories for a first time frame, and a second set of data indicating second interaction amounts for a second plurality of interactions associated with the plurality of categories for a second time frame, wherein the second time frame is longer than the first time frame;
determining, by the system and for each category, a total category amount based on the first interaction amounts indicated in the first set of data;
determining, by the system and for each category, a difference between the total category amount and an average category amount based on the second interaction amounts indicated in the second set of data;
determining, by the system and for each category, a proportion of the total category amount relative to a total account amount, wherein the total account amount is a total of the first interaction amounts in the first set of data; and
transmitting, by the system and to the user device, data associated with the ring-shaped user interface element to be displayed on a display of the user device, wherein the data associated with the ring-shaped user interface element indicates a plurality of segments corresponding to the plurality of categories,
wherein a width of a particular segment is based on a default value and a comparison of a threshold range and the difference between the total category amount and the average category amount, and
wherein an arc length of the particular segment is based on the proportion of the total category amount for the corresponding category to the total account amount.

8. The method of claim 7, further comprising:
transmitting, to the user device, data indicating a selectable option to receive information related to a category having a corresponding proportion greater than respective proportions of other categories included in the plurality of categories.

9. The method of claim 7, further comprising:
transmitting, to the user device, data indicating a selectable option to receive information related to a category corresponding to a segment having a width greater than respective widths of other segments included in the plurality of segments.

10. The method of claim 7, wherein the data indicating the request for information includes data indicating a particular calendar month, and the first time frame is the particular calendar month.

11. The method of claim 7, further comprising:
receiving, from the user device, data indicating a selection of one of the segments; and
transmitting, to the user device and based on the selection of the one of the segments, data corresponding to information related to a category corresponding to the one of the segments.

12. A user device configured to present a ring-shaped user interface element, comprising:
a memory; and
one or more processors, communicatively coupled to the memory, configured to:
present, on a user interface associated with a user account, an interaction element;
detect a user interaction, with the user device, that indicates the interaction element; and
present, on the user interface and based on the user interaction, the ring-shaped user interface element that includes a plurality of segments corresponding to a plurality of categories associated with the user account,
wherein the plurality of categories are based on a plurality of interactions associated with the user account and a third party,
wherein the plurality of interactions comprises information associated with a time of an interaction of the plurality of interactions and information associated with an interaction amount associated with the interaction, and
wherein each category has, associated with that category:
a total category amount corresponding to a total amount for a first plurality of interactions associated with the user account within a first time frame, and
an average category amount corresponding to an average amount for a second plurality of interactions associated with the user account within a second time frame, wherein the second time frame is longer than the first time frame,
wherein a width of a particular segment is based on a default value and a comparison between a threshold range and a difference between the total category amount for a corresponding category and the average category amount for the corresponding category,
wherein the average category amount for the corresponding category is based on historical interaction data associated with the corresponding category, and
wherein an arc length of the particular segment is based on a proportion of the total category amount for the corresponding category relative to a total account amount, wherein the total account amount is the total amount for interactions associated with the user account that occur within the first time frame.

13. The user device of claim 12, wherein the one or more processors are further configured to:
present, on the user interface and in a center of the ring-shaped user interface element, the total category amount for a corresponding segment having a greatest proportion out of the plurality of segments.

14. The user device of claim 12, wherein the one or more processors are further configured to:
present, on the user interface and in a center of the ring-shaped user interface element, the total category amount for a corresponding segment having a greatest width out of the plurality of segments.

15. The user device of claim 12, wherein the one or more processors are further configured to:
present, on the user interface, a second interaction element corresponding to information related to a category corresponding to a segment having a width greater than respective widths of other segments included in the plurality of segments.

16. The user device of claim 12, wherein the one or more processors are further configured to:
present, on the user interface, a second interaction element corresponding to information related to a category having a proportion greater than respective proportions of other categories of the plurality of categories.

17. The user device of claim 12, wherein the one or more processors are further configured to:
detect a second user interaction, with the user device, that indicates one of the segments; and
present, on the user interface and based on the second user interaction, information related to a category corresponding to the one of the segments indicated by the second user interaction.

18. The system of claim 1, wherein when the difference between the total category amount and the average category amount is within a threshold range, the width is set to a default value.

19. The system of claim 1, wherein the comparison indicates whether the difference between the total category amount and the average category amount is within the threshold range, greater than the threshold range, or less than the threshold range.

20. The system of claim 1, wherein the width varies based on whether the difference between the total category amount and the average category amount is within the threshold range, greater than the threshold range, or less than the threshold range.

* * * * *